United States Patent [19]

Bartlett et al.

[11] Patent Number: 4,833,338

[45] Date of Patent: May 23, 1989

[54] FERRORESONANT REGULATOR FOR INDUCTIVELY COUPLED POWER DISTRIBUTION SYSTEM

[75] Inventors: Ted L. Bartlett, Bellevue; Mervin E. Eaton, Seattle, both of Wash.

[73] Assignee: The Boeing Company, Seattle, Wash.

[21] Appl. No.: 228,376

[22] Filed: Aug. 4, 1988

[51] Int. Cl.⁴ ............................................ H02J 3/10

[52] U.S. Cl. .................................... 307/17; 307/33; 307/42; 323/306; 363/75; 455/3; 455/41

[58] Field of Search ...................... 307/17, 27, 31, 33, 307/34, 42; 323/306-309; 363/75; 455/3, 41, 346

[56] References Cited

U.S. PATENT DOCUMENTS

| | | | |
|---|---|---|---|
| 3,037,160 | 5/1962 | Manteuffel | 323/56 |
| 3,129,381 | 4/1964 | Manteuffel | 323/89 |
| 3,544,885 | 12/1970 | Friedlander et al. | 323/61 |
| 3,560,837 | 2/1971 | Gately | 307/34 |
| 3,569,833 | 3/1971 | Milton | 325/26 |
| 3,818,314 | 6/1974 | Bishop et al. | 321/45 R |
| 3,955,134 | 5/1976 | Woodford | 323/61 |
| 4,017,790 | 4/1977 | Friedlander | 323/110 |
| 4,428,078 | 1/1984 | Kuo | 455/3 |
| 4,439,722 | 3/1984 | Budnik | 323/248 |
| 4,558,229 | 12/1985 | Massey et al. | 307/17 |
| 4,736,452 | 4/1988 | Daniels et al. | 455/41 |

OTHER PUBLICATIONS

E. Friedlander, "Static Network Stabilization, Recent Progress in Reactive Power Control," 1966.

*Primary Examiner*—William H. Beha, Jr.
*Attorney, Agent, or Firm*—Christensen, O'Connor, Johnson & Kindness

[57] ABSTRACT

A ferroresonant regulator for use in an inductively coupled high frequency power distribution system. A constant current resonant power source, comprising a sine wave oscillator (12), an amplitude controlled amplifier (16), a power amplifier (20), and an impedance matching transformer (24), provides current at a frequency of 38 kHz to a supply loop (68) that is installed in the floor of an aircraft passenger space. A current sensing transformer (32), and a voltage sensor (46) produce feedback signals that are used to control the amplitude of the current circulating in the supply loop, maintaining it substantially constant. A plurality of multiturn coils (70) are disposed proximate the supply loop. Connected to each of the multiturn coils is a saturable transformer (76), which includes a secondary winding attached to a load comprising an entertainment and passenger service system installed in each seat. A tertiary winding (106) on the saturable transformer is connected across a resonance capacitor (108). The capacitor is used to resonate the saturable transformer, causing its core to saturate. A constant voltage is thus maintained across the connected load with respect to variations in the load and variations in the inductive coupling between the multiturn coil and the supply loop.

20 Claims, 2 Drawing Sheets

FERRORESONANT REGULATOR FOR INDUCTIVELY COUPLED POWER DISTRIBUTION SYSTEM

TECHNICAL FIELD

This invention generally pertains to a system for distributing power to a plurality of loads inductively coupled to a supply loop, and more specifically, to a regulator for the distributed loads.

BACKGROUND OF THE INVENTION

Airline companies ordering aircraft typically specify a number of options, including passenger seating layout. Manufacturing and inventory costs incurred in providing different seating arrangements and spacing between seats are significant. This problem is of greater concern in newer generation aircraft in which a passenger service system and an optional entertainment system may be installed in the back of each seat. Using conventional techniques, an aircraft manufacturer would be forced to inventory and install different length power lead harnesses to supply power to the seats for each seating arrangement. The cost and weight penalty associated with such a requirement would likely be unacceptable to most passenger carriers.

An alternative to wiring each seat to a power source is disclosed in commonly assigned U.S. Pat. No. 4,428,078 (C. Kuo). This patent discloses what is referred to therein as a "wireless system" for supplying power to a plurality of multiple turn pickup coils disposed in the base of seats throughout an aircraft cabin. Perhaps a more accurate term would be a "connectorless" system, since power is inductively coupled from a power supply loop that is disposed in the floor of the aircraft cabin to the pickup coils without the use of a direct electrical connection. This connectorless system permits the seats to be moved about in different arrangements without concern for interconnecting wiring. Not disclosed in the patent are details concerning the regulation of voltage at each of the distributed loads that are inductively coupled to the supply loop.

The connectorless power distribution system described in the above patent has been further developed, and now includes a precisely controlled constant current source driving a series resonant supply loop. Each of the pickup coils is loosely coupled to the supply loop, with a coefficient of coupling in the range from 0.01 to 0.10. The leakage inductance of the supply loop and of each pickup coil is very large compared to their mutual inductance, and is the source of most of the voltage drop of the power source. A series resonant capacitor is provided to nullify the leakage inductance of the supply loop, leaving only the resistance and mutual inductance to impede primary current flow. Since the mutual inductance of the pickup coils appears in series in the supply loop, the constant current source can only maintain a constant voltage at the output of the pickup coil so long as the mutual inductance and load remains constant. However, the mutual inductance is inversely proportional to the distance between the supply loop and the pickup coils, and the distance may vary significantly. In addition, the electrical load on each pickup coil may vary over a relatively wide range. Because of these variable parameters, a regulator must be provided for each pickup coil to maintain a constant voltage across its load.

Design of an appropriate regulator may initially seem a trivial problem. For example, a series pass regulator admittedly could be used to regulate the voltage across each distributed load. However, the efficiency of such a regulator circuit would be relatively low. In addition, high peak currents from any capacitive filter used upstream of the load would be reflected back to the supply loop, causing unacceptable electromagnetic interference (EMI) and possible disruption of the constant current source. Similar problems would likely arise if a switching regulator was used. Shunt regulators, such as a "Q spoiler" could be used to regulate the voltage on the pickup coil by providing a controlled shunt across the tank circuit, in a feedback loop. Unfortunately, shunt regulators tend to be highly dissipative, and such regulators would typically involve a high part count and unacceptable cost factor.

In consideration of the above-described problems, it is an object of the present invention to provide a low-cost regulator for each load of a connectorless power distribution system. It is a further object to partially compensate the leakage inductance of the pickup coils comprising the system, using the residual leakage inductance to ferroresonantly regulate the voltage across the load. Another object is to provide a buffer between the supply loop and the pickup coils. A still further object is to protect the supply loop against short circuits. These and other objects and advantages of the present invention will be apparent from the attached drawings and the Description of the Preferred Embodiments that follows.

SUMMARY OF INVENTION

In accordance with the present invention, a ferroresonant regulator is provided for use in a high frequency power distribution system having a resonant conductive supply loop, through which a constant sinusoidal current flows to inductively supply power to at least one remote load. A pickup coil is disposed proximate the conductive supply loop, and is inductively coupled to it. Current at the frequency of the sinusoidal constant current in the supply loop is thus induced to flow in the pickup coil. A compensation capacitor is connected to the pickup coil and has a capacitance value selected to partially compensate for the leakage inductance of the pickup coil.

The compensation capacitor is connected in series with the pickup coil and a primary winding of a saturable transformer. The saturable transformer includes a secondary winding that is connected to the load, and a tertiary winding that is connected to a resonance capacitor. The capacitance of the resonance capacitor is selected to produce ferroresonance in the saturable transformer at the frequency of the sinusoidal constant current flowing in the supply loop, so that the saturable transformer regulates voltage applied to the load from its secondary winding, with respect to variations in the load and variations in the coupling of current from the supply loop to the pickup coil.

The frequency of the constant sinusoidal current flowing in the supply loop is preferably greater than 10 kHz. To facilitate its operation at that relatively high frequency, the saturable transformer preferably comprises a toroid core wound with a nickel alloy tape.

In another preferred embodiment, the saturable transformer further includes a fourth winding that is connected to a second load. The transformer regulates the voltage applied to the second load from the fourth winding as the second load varies.

Although useful in other applications, the ferroresonant regulator is particularly applicable to regulating the voltage at pickup coils associated with a plurality of seats on an aircraft. The pickup coils are each disposed at the base of a seat, proximate to the supply loop that is installed in the floor of the aircraft. Power is supplied by the pickup coils to a load comprising an electronic entertainment system and passenger service system disposed at each group of seats.

A method for regulating voltage in a high frequency power distribution system is another aspect of this invention, and includes steps generally in accordance with the functions implemented by the apparatus described above.

DESCRIPTION OF THE PREFERRED EMBODIMENTS

As noted above, a system for distributing power and communication signals to a passenger entertainment system and a passenger service system installed within the seats of an aircraft is disclosed in detail in commonly assigned U.S. Pat. No. 4,428,078. The disclosure of that patent is specifically incorporated herein by reference, in its entirety. The present invention represents a further development of the above-referenced power distribution system, and in the preferred embodiment, is specifically directed to providing regulation of the voltage applied to each of a plurality of remotely located loads, such as the passenger entertainment and service systems, which are installed in passenger seat groups within the cabin of an aircraft. The entertainment system may include a flat video monitor and audio channels, while the passenger service system may include stewardess call, ventilation, and lighting controls. DC power required by the entertainment and passenger service systems is provided through a multiturn pickup coil disposed at the base of each group of seats, proximate a supply loop, in an arrangement like that disclosed in the above-referenced patent.

Figure 1:
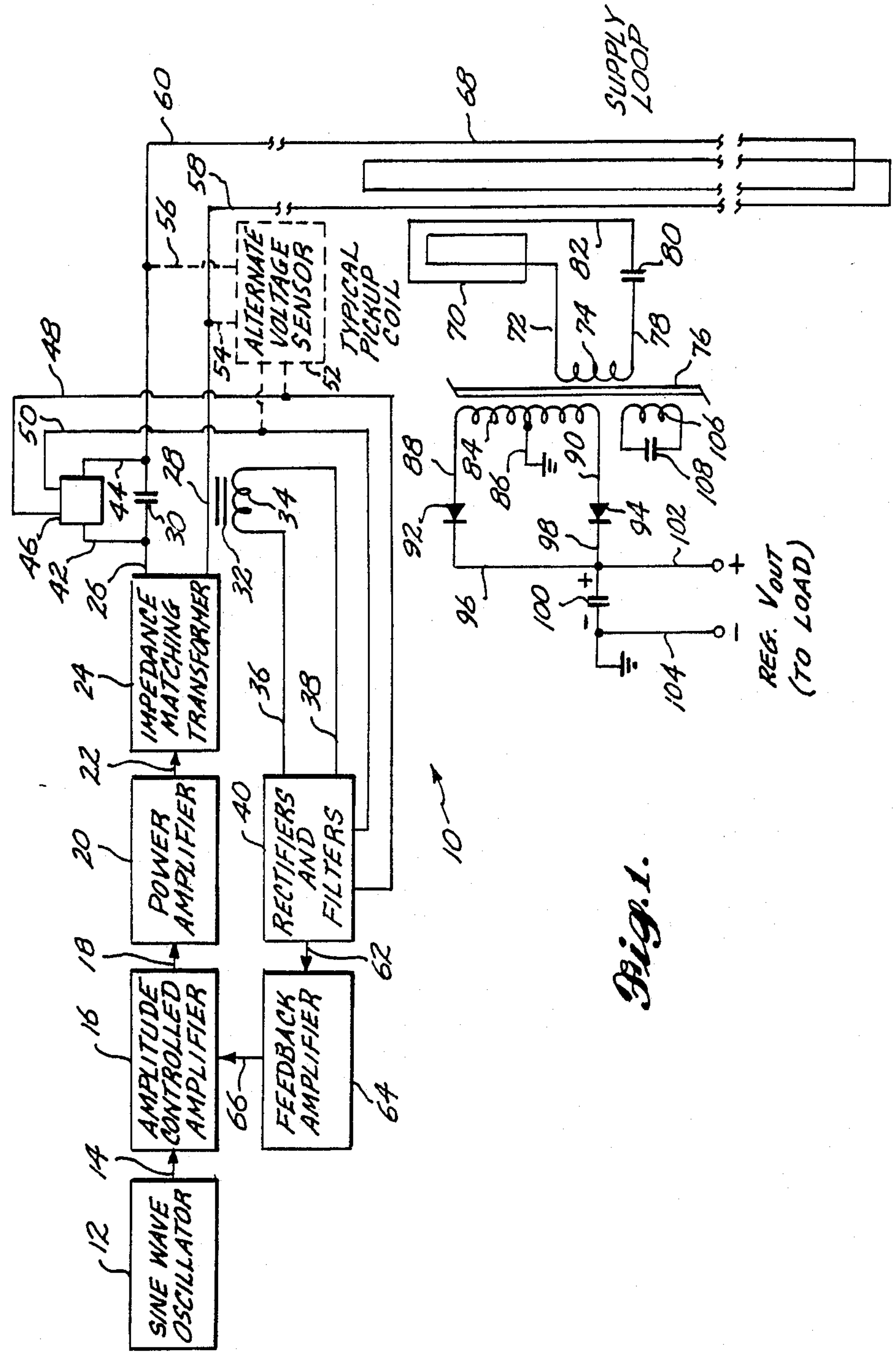
FIG. 1 is a schematic block diagram showing the high frequency power distribution system, and illustrating a typical regulator circuit for one of the loads, which is inductively supplied power by the system.

Turning now to FIG. 1, an inductively coupled power distribution system incorporating the present invention is generally denoted by reference numeral 10. The first component of the power distribution system is a sine wave oscillator 12, which produces a low voltage, low current sine wave signal having a frequency of 38 kHz in the preferred embodiment. Sine wave oscillator 12 has a relatively low distortion rating to avoid creating high order harmonics on its output that might cause electromagnetic interference (EMI) with respect to the operation of communication systems and other electronic gear on the aircraft. Although a square wave generator or other periodic signal source could be used in the power distribution system, the harmonic content of nonsinusoidal waveforms and resulting EMI would typically be unacceptable for the proposed application.

The 38 kHz signal produced by the sine wave oscillator is conveyed through a lead 14 to the input of an amplitude controlled amplifier 16. The voltage gain of amplitude controlled amplifier 16 is controlled by a feedback signal, as described in further detail below. A signal output from the amplitude controlled amplifier is conveyed through a lead 18 to the input of a power amplifier 20, which has a rated capacity sufficient to supply the total maximum power requirement of the load inductively coupled to power distribution system 10. Power amplifier 20 introduces minimal harmonic distortion in its 38 kHz constant current sinusoidal output signal to avoid creating a potential EMI problem. Since the power amplifier operates at a single frequency, its design may be optimized for that frequency.

The output impedance of power amplifier 20 is relatively low; to insure efficient power transfer, the output of the power amplifier is connected through a lead 22 to an impedance matching transformer 24, having an input impedance that matches the impedance of the power amplifier. Similarly, the output impedance of the transformer matches the impedance of a supply loop 68 through which output current from impedance matching transformer 24 circulates. The output current from the impedance matching transformer flows through a lead 26, which is connected to one side of a series resonant capacitor 30. The other side of the series resonant capacitor is connected to the supply loop through a lead 60. Current flows through a lead 58 from the supply loop, and through a current sensing transformer 32, returning to the impedance matching transformer through a lead 28. The capacitance of the series resonant capacitor is selected so that the power supply loop resonates at 38 kHz. As noted above, the inductive reactance of supply loop 68 primarily comprises a leakage inductance. The leakage inductance is nullified or compensated by series resonant capacitor 30, so that the remaining impedance of supply loop 68 comprises its resistance and the total mutual inductance of the supply loop and plurality of pickup coils to which power is supplied.

The electrical load represented by the entertainment and passenger service systems is variable. Proper operation of power distribution system 10 requires that a constant current flow through supply loop 68. Constant current is achieved by providing a feedback signal to control the voltage gain of amplitude controlled amplifier 16. Current flowing through the supply loop is monitored by current sensing transformer 32. A secondary winding 34 of this transformer is connected through leads 36 and 38 to a rectifier and filter circuit 40. The current flowing in secondary winding 34 and through leads 36 and 38 is thus proportional to the current flowing through the supply loop. Rectifier and filter circuit 40 includes a shunt resistor (not shown) across which a voltage drop is developed corresponding to the magnitude of the supply loop current. The voltage developed across the shunt resistor due to the secondary current of current sensing transformer 32 is full wave rectified and filtered within circuit 40, producing a DC feedback signal indicative of the magnitude of the current in the supply loop.

A voltage sensor 46 is connected across series resonant capacitor 30 by leads 42 and 44 to monitor its voltage drop, producing another input signal for rectifier and filter circuit 40, carried over leads 46 and 48. This signal is full wave rectified and filtered within circuit 40, resulting in a DC signal indicative of the supply loop voltage. The filtered and rectified current and voltage feedback signals are summed, producing a combined feedback signal that is output from rectifier and filter circuit 40 through a lead 62 to a feedback amplifier 64. An amplified feedback signal output from the feedback amplifier is input to amplitude controlled amplifier 16 over lead 66 to control its gain.

Current sensing transformer 32 ensures that a constant current is maintained within supply loop 68, while voltage sensor 46 monitors the voltage drop across the series resonant capacitor to ensure that excessive power is not drawn by the supply loop. Leads 42, 44 and voltage sensor 46 may be replaced by an alternate voltage sensor 52, having an input connected across the supply loop by leads 54 and 56. The output of the alternate voltage sensor is connected to leads 48 and 50 in place of the output of voltage sensor 46. Alternate voltage sensor 52 serves the same function as voltage sensor 46, i.e., protection against overload on power amplifier 20, by monitoring the voltage developed across supply loop 68.

Supply loop 68 is installed within the floor of the aircraft cabin. The installation is similar to that described in the referenced U.S. Pat. No. 4,428,078, with respect to the supply loop 26, shown in FIGS. 1 through 4 of that reference. In the preferred embodiment of the present invention, supply loop 68 comprises four turns of copper wire formed into an elongate coil, about 30 feet in length. The number of turns and size of the conductor used for the supply loop are in part determined by the total power demand of the load and the magnitude of the constant current flowing within supply loop 68. The conductor comprising supply loop 68 is covered by a nonferrous flooring material to avoid magnetically shielding it. A plurality of pickup coils are disposed proximate the floor of the aircraft cabin, so that they are magnetically coupled to the supply loop. For example, the pickup coils may be positioned flat on the floor underneath each group of seats, overlying the supply loop, and protected from abrasion by a plastic cover (not shown).

As shown in FIG. 1, a typical pickup coil comprises a multiturn coil 70 that is connected at one end through a lead 72 to a primary winding 74 of a saturable transformer 76. The other end of the multiturn coil is connected in series with a leakage inductance compensation capacitor 80 by a lead 82. The other side of capacitor 80 is connected through a lead 78 to the other end of saturable transformer 76.

Saturable transformer 76 preferably comprises a toroid shaped core wound with a "round" 80% nickel alloy tape for control of saturation. (The term "round" refers to the characteristic shape of the nickel alloy's B-H hysteresis curve.) Conventional ferroresonant transformers used at much lower powerline frequencies, i.e., 60 through 400 Hertz, have cores with specially developed laminations that include the required leakage inductance and saturating transformer in one integral unit. Such devices are generally unusable in the present application because of the relatively high frequency of the current employed in the connectorless power distribution system. If the frequency of the current was less than 10 kHz, an unreasonably large pickup coil would be required to achieve efficient inductive coupling with the supply loop.

In the preferred embodiment, a Magnetics Corporation Type 5000½-R permalloy tape-wound core is used for constructing saturable transformer 76. Suitable tape-wound toroid cores are also available from other sources. Alternatively, nontape-wound saturable transformers designed for use at the high frequency of the current flowing in supply loop 68, such as a METGLAS TM cobalt alloy core sold by Allied Corp., may be used for saturable transformer 76.

Primary winding 74 of the saturable transformer comprises cooper wire wound around the toroid in spaced-apart turns. In the preferred embodiment, the saturable transformer includes a center-tap secondary winding 84, which is wound over the primary winding. The center tap of the secondary winding is connected to ground through a lead 86. Leads 88 and 90, respectively, connect each end of secondary winding 84 to the anode of diodes 92 and 94. The cathodes of these diodes are connected together via leads 96 and 98, thereby providing full wave rectification for current flowing through each end of the secondary winding. Leads 96 and 98 are connected to an electrolytic capacitor 100 and to a lead 102. Lead 102 provides a positive regulated output voltage to the connected load, i.e., the electronic entertainment system and passenger service system installed in the group of seats associated with multiturn coil 70. The other side of the electrolytic capacitor is connected to ground and to the negative side of the load through a lead 104.

A tertiary winding 106 on saturable transformer 76 is connected across a resonant capacitor 108. The capacitance value of resonant capacitor 108 is selected so that saturable transformer 76 resonates at the 38 kHz frequency of current flowing in supply loop 68. Saturable transformer 76 thus operates as a ferroresonant regulator to control the voltage output on leads 102 and 104, maintaining it substantially constant with respect to variations in the load, and with respect to variations in the inductive coupling between multiturn coil 70 and supply loop 68.

As a passenger energizes different functions or features of the entertainment and passenger service systems comprising the load in the preferred embodiment, the power demand and thus the load current changes accordingly. Another variable in the system comprises the spacing and thus the inductive coupling between the various multiturn coils 70 and supply loop 68. The inductive coupling may be different at each pickup coil and is subject to change. For example, if a passenger places carry-on baggage underneath the seat so that it rests on top of the pickup coil, the weight of the baggage may slightly change the spacing between the multiturn coil and supply loop, and thereby changes the inductive coupling between the two. Such variations in load and in the inductive coupling between the multiturn coil and supply loop are compensated by the ferroresonant regulator comprising saturable transformer 76.

The ferroresonant regulator used to regulate the voltage across the load in inductively coupled power distribution system 10 is ideal for this purpose, since it avoids introducing relatively steep slope waveforms (e.g., step-function changes in potential) into the system that would otherwise occur if duty cycle-type regulators were used. As a result, most EMI problems are eliminated. In addition, the ferroresonant regulator circuit is extremely simple, comprising a saturable transformer 76, a leakage inductance compensating capacitor 80 and a resonant capacitor 108. The leakage inductance of the ferroresonant regulator provides a buffer between the power source, i.e., the output from impedance matching transformer 24 (shown in FIG. 1) and the load, effectively limiting the peak current reflected from the load back to supply loop 68, thus providing inherent short circuit protection. Although the ferroresonant regulator requires a relatively precise fixed frequency, this limitation is entirely acceptable, because the supply loop must also operate as a resonant circuit at a fixed frequency.

Figure 2:
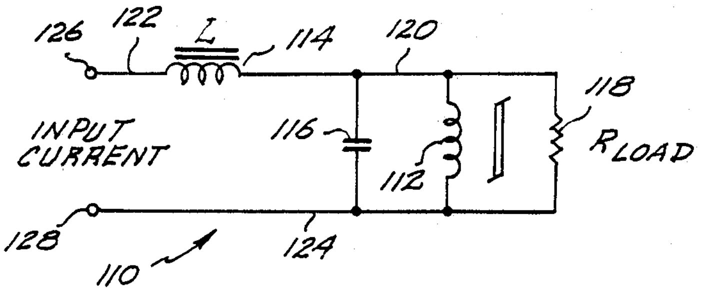
FIG. 2 is an equivalent circuit of a ferroresonant regulator.

In FIG. 2, an equivalent circuit for the ferroresonant regulator is generally denoted at 110. The equivalent circuit comprises a saturable transformer winding 112, which is connected in parallel with a capacitor 116 and a load resistance 118 by conductors 120 and 124. An input terminal 126 is connected through a lead 122 to a leakage inductance 114, and thus in series with each of the parallel connected elements just described. Another input terminal 128 is connected to conductor 124. The leakage inductance 114 resonates with capacitor 116 and saturable transformer winding 112. At resonance, the voltage across capacitor 116 quickly reaches a maximum as the saturable transformer winding is driven into saturation. When the core of the saturable transformer saturates, the transformer operates in a constant volt-second portion of its characteristic curve, limiting the voltage across the load to a predetermined value.

In a more typical application of a conventional ferroresonant regulator, which operates at a frequency in the range from 60 to 400 Hertz, a coil (or integral lamination structure) is required to provide the leakage inductance 114. In the ferroresonant regulator comprising the present invention, the leakage inductance characteristic of multiturn coil 70 is much more than is required to promote ferroresonant regulation. Excessive leakage inductance is nullified by leakage inductance compensation capacitor 80, leaving a sufficient residual leakage inductance for proper ferroresonance regulation. Resonant capacitor 108 provides the capacitance necessary for saturable transformer 76 (shown in FIG. 1), to operate as a ferroresonant regulator.

Figure 3:
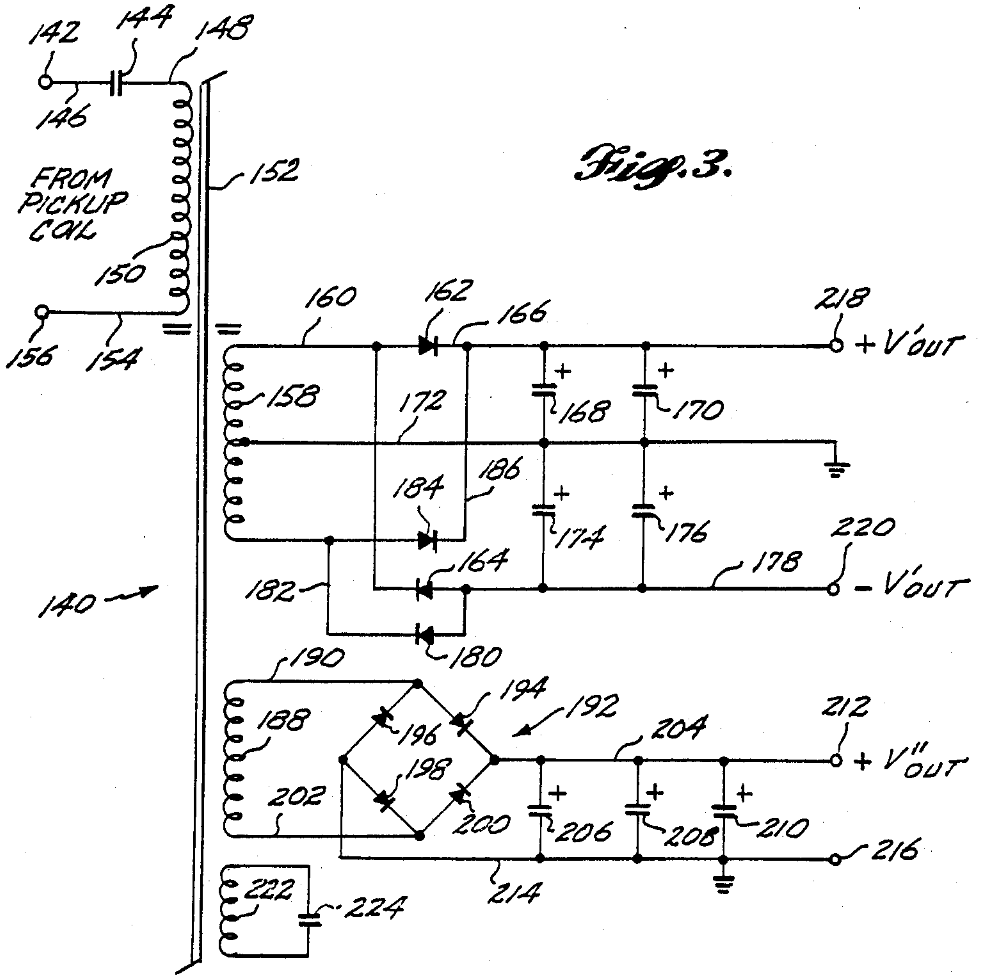
FIG. 3 is a schematic diagram of a second embodiment of the ferroresonant regulator.

Referring now to FIG. 3, a second embodiment of the ferroresonant regulator, generally identified by reference numeral 140, provides multiple output voltages to a load. An input terminal 142 is connected to a multiturn pickup coil (not shown), which is similar to multiturn coil 70 in FIG. 1. Current from the multiturn coil flows into input terminal 142 and is conveyed through a lead 146 to one side of a leakage inductance compensation capacitor 144. The other side of capacitor 144 is connected by a lead 148 to one end of a primary winding 150 of a saturable transformer 152, the other end of the primary winding being connected through a lead 154 to an input terminal 156, and thus to the multiturn coil.

Saturable transformer 152 includes a center-tap secondary winding 158, one end of which is connected through a lead 160 to the anode of a diode 162 and to the cathode of a diode 164. The cathode of diode 162 is connected through a lead 166 to one side of two parallel capacitors 168 and 170, and to a +V′ output terminal 218. The center-tap of secondary winding 158 is connected to ground through a lead 172 and to the other side of parallel connected capacitors 168 and 170. In addition, lead 172 connects to one side of parallel capacitors 174 and 176. The other side of parallel capacitors 174 and 176 is connected to a lead 178 and, thus, to the anodes of diodes 164 and 180. Lead 178 also connects a −V′ output voltage terminal 220.

The cathode of diode 180 is connected through lead 182 to the other side of secondary winding 158, and to the anode of a diode 184. The cathode of diode 184 is connected to lead 166 through a lead 186. Diodes 162, 164, and diodes 180 and 184 respectively provide full wave rectification for separate positive and negative DC voltages (relative to ground potential), which are supplied to a load through output terminals 218 and 220. Capacitors 168 and 170 filter the +V′ DC voltage at output terminal 218, while capacitors 174 and 176 filter the −V′ DC voltage at output terminal 220.

A third winding 188 is connected at one end through a lead 190 to a full wave rectifier bridge comprising four diodes 194, 196, 198 and 200. The other input to full wave rectifier bridge 192 is connected to the other end of winding 188 through a lead 202. The positive output of the bridge is connected through a lead 204 to one side of each of three parallel capacitors 206, 208 and 210, providing a +V″ DC voltage at output terminal 212. The other ends of each of the three parallel connected capacitors are connected to a lead 214, which extends between the negative output of the bridge and a grounded output terminal 216. The three parallel capacitors filter the output signal from the full wave rectifier bridge.

The magnitudes of output voltages ±V′ and +V″ depend upon the turns ratio of primary winding 150 relative to secondary windings 158 and 188. In one preferred embodiment, ±8 volts DC is provided at output terminals 218 and 220 and +12 volts DC at output terminal 212. The core of saturable transformer 152 preferably comprises either a permalloy tapewound or METGLAS TM toroid, and the saturable transformer is generally constructed in the same manner as saturable transformer 76 in the first preferred embodiment.

A fourth winding 222 is connected across a resonance capacitor 224. The capacitance of resonance capacitor 224 is selected so that saturable transformer 152 resonates at the frequency of the constant sinusoidal current flowing in supply loop 68. Saturable transformer 152 thus functions as a ferroresonant regulator, serving to maintain the voltages at output terminals 218, 220 and 212 relatively constant as the attached loads, and the inductive coupling of supply loop 68 to multiturn coil 70 vary.

While the present invention has been disclosed with respect to its preferred embodiments, those of ordinary skill in the art will appreciate that modifications may be made to the invention within the scope of the claims that follow below. Accordingly, the scope of the invention is to be determined entirely by reference to the claims, and is not to be limited in any way by the disclosure of the preferred embodiments.

The embodiments of the invention in which an exclusive property or privilege is claimed are defined as follows:

1. In a high frequency power distribution system having a series resonant conductive supply loop through which a constant sinusoidal current flows to inductively supply power to at least one remote load, a ferroresonant regulator for the remote load, comprising:

(a) a pickup coil disposed proximate the conductive supply loop and inductively coupled to it, so that current is induced to flow in the pickup coil at the frequency of the constant sinusoidal current in the supply loop;

(b) a compensation capacitor connected to the pickup coil, having a capacitance selected to partially compensate for a leakage inductance of the pickup coil;

(c) a saturable transformer having a primary winding connected to the compensation capacitor and to the pickup coil, a secondary winding connected to the load, and a tertiary winding; and (d) a resonance capacitor connected to the tertiary winding, and having a capacitance selected to produce ferroresonance in the saturable transformer at the frequency of the constant sinusoidal current in the supply loop, so that the saturable transformer regulates voltage applied to the load from the secondary winding, with respect to variations in the load and variations in the coupling of current from the supply loop to the pickup coil.

2. The ferroresonant regulator of claim 1, wherein the frequency of the constant sinusoidal current flowing in the supply loop is greater than 10 kHz.

3. The ferroresonant regulator of claim 1, wherein the saturable transformer comprises a toroid core.

4. The ferroresonant regulator of claim 3, wherein the toroid core is wound with a nickel alloy tape.

5. The ferroresonant regulator of claim 1, wherein the saturable transformer further comprises a fourth winding connected to a second load, said saturable transformer being operative to regulate the voltage applied to the second load from the fourth winding, with respect to variations in the second load.

6. The ferroresonant regulator of claim 1, wherein the supply loop is disposed in the floor of an aircraft, said power distribution system further comprising a plurality of pickup coils, each of the pickup coils being associated with one of a plurality of groups of seats on the aircraft, and being disposed at the base of a seat.

7. The ferroresonant regulator of claim 6, wherein the load comprises an electronic entertainment system and passenger service system disposed at each group of seats.

8. A power distribution system for supplying regulated power to a plurality of remotely located loads using an inductively coupled resonant supply loop, comprising:

(a) power source means for producing a constant sinusoidal current in the supply loop, said current having a fixed high frequency at which the supply loop resonates;

(b) multiturn coil means associated with each remotely located load and disposed proximate the supply loop, for inductively coupling to the current flowing in the supply loop, causing current to flow in the multiturn coil means, said multiturn coil means having a leakage inductance;

(c) means for partially compensating for the leakage inductance of the multiturn coil means; and (d) ferroresonant means connected to the compensating means and the multiturn coil means, for ferroresonantly regulating a voltage provided to the remotely located loads, said regulated voltage remaining substantially constant with respect to variations in the remotely located loads and in the inductive coupling of the supply loop to the multiturn coil means.

9. The power distribution system of claim 8, wherein the ferroresonant means comprise a saturable transformer and a resonant capacitor.

10. The power distribution system of claim 9, wherein the saturable transformer comprises a nickel alloy tape-wound toroid.

11. The power distribution system of claim 8, wherein the means for compensating comprise a capacitor connected in series with the multiturn coil means and the ferroresonant means.

12. The power distribution system of claim 8, wherein the supply loop is disposed in the floor of an aircraft passenger space, and the multiturn coil means are disposed adjacent the supply loop, under seats provided in the passenger space.

13. The power distribution system of claim 12, wherein the remotely located loads comprise electronic entertainment and passenger service systems disposed at the seats.

14. The power distribution system of claim 12, wherein the variation in inductive coupling between the supply loop and the multiturn coil means is due at least partly to variation in the spacing between them.

15. In a high frequency power distribution system having a resonant conductive supply loop through which a constant sinusoidal current flows to inductively supply power to a remotely located pickup coil disposed proximate the supply loop, said pickup coil being associated with a load, a method for regulating the voltage across the load, comprising the steps of:

(a) capacitively compensating at least part of a leakage inductance of the pickup coil;

(b) connecting a primary winding of a saturable transformer to the pickup coil; and (c) capacitively and inductively resonating the saturable transformer, so that the voltage across a secondary winding of the saturable transformer that is connected to the load is regulated to substantially a constant value with respect to variations in the voltage induced in the primary winding and with respect to variations in the current required by the load.

16. The method of claim 15, wherein the frequency of the current in the supply loop is greater than 10 kHz.

17. The method of claim 15, wherein the saturable transformer comprises a toroid core wound with a nickel alloy tape.

18. The method of claim 15, wherein the supply loop is disposed in the floor of an aircraft cabin and wherein the pickup coil is disposed proximate the floor, under an aircraft seat.

19. The method of claim 15, wherein the saturable transformer comprises a cobalt alloy core.

20. The method of claim 18, wherein the load comprises an electronic entertainment and passenger service system disposed in the aircraft seat.

* * * * *